United States Patent Office 3,845,184
Patented Oct. 29, 1974

3,845,184
EXTRUSION OF FOAMED POLYMER OVER
DIVERGING MANDREL EXTENSION
Ludo C. Nackaerts, Louvain, Belgium, assignor to
Phillips Petroleum Company
Filed Oct. 24, 1972, Ser. No. 299,833
Int. Cl. B29d 23/04, 27/00; B29f 3/04
U.S. Cl. 264—54                          10 Claims

ABSTRACT OF THE DISCLOSURE

Cellular polymer extrudates are formed by passing molten polymer containing an expanding agent through a die which allows gradual expansion thereof just before it leaves the die. The extrudate is then drawn over a gradually diverging mandrel extension. The process is particularly applicable to the forming of rigid PVC pipe.

BACKGROUND OF THE INVENTION

This invention relates to the formation of cellular tubular extrudates.

It has long been known to form cellular extrudates. However, the successful commercial production of cellular tubular extrudates, particularly self-supporting extrudates such as pipe, presents many problems. With PVC, for instance, temperatures of greater than 190° C. are frequently required which present the dual problem of thermol instability and low viscosity with its resultant tendency to cause bubble collapse. Even processes which seem acceptable on a laboratory scale may be unacceptable for commercial use because of buildup of additives on the extrusion die. Finally, it is difficult to obtain a uniform cellular structure at the lower density levels. With rigid PVC, for instance, densities of less than 0.80 are difficult to obtain even when using elaborate and expensive modifications to conventional extrusion equipment.

BRIEF SUMMARY OF THE INVENTION

It is an object of this invention to provide low density cellular tubular extrudates;

It is a further object of this invention to allow fabrication of high quality cellular tubular extrudates with a minimum of modification of conventional extrusion equipment;

It is yet a further object of this invention to provide formulations which allow continuous extrusion of tubular cellular extrudates without buildup of deposits on the die; and It is still yet a further object of this invention to utilize apparatus for continuously forming high quality, low density cellular tubular extrudates which can be adapted from conventional extrusion apparatus with a minimum of modification.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
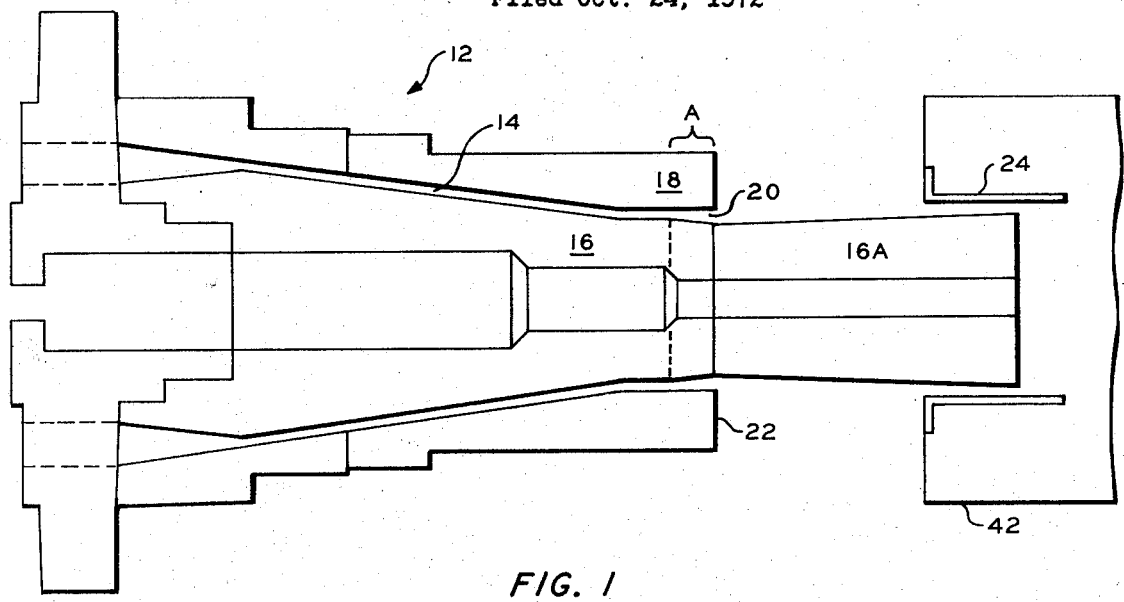
FIG. 1 is a cross sectional view of a die head in accordance with the invention.

The invention is broadly applicable to the production of cellular extrudates of any thermoplastic but is of primary utility in the formation of articles from rigid polyvinyl chloride. In the most preferred embodiments the rigid PVC formulation can contain small amounts of a conventional plasticizer such as dioctylphthalate. By small amounts it is meant amounts well below the amount required to make a plasticized formulation. Suitable amounts would be less than 10 percent, preferably 0.25 to 3, more preferably 0.5 to 2, weight percent based on the weight of the polymer. Other thermoplastic materials normally formed into cellular structures such as olefin polymers, particularly polymers and copolymers of ethylene, propylene, and butene, polystyrene, and the like can also be fabricated in accordance with the invention.

While any conventional expanding agent can be utilized in accordance with the invention it is particularly preferred to utilize a formulation comprising PVC, a chemical blowing agent such as azobisformamide, N,N'-dinitrosopentamethylenetetramine, 4,4' - oxibis(benzenesulfonyl hydrazide), and the like with a combination of a low temperature promoter and a high temperature promoter. Suitable low temperature promoters are tribasic lead sulfate, monobasic lead stearate, dibasic lead phosphite, dibasic lead stearate, neutral lead stearate and zinc stearate. Suitable high temperature promoters are calcium stearate and tin stabilizers. As noted hereinabove a small amount of plasticizer is desirable. The formulation can also contain fillers and/or nucleating agents. Fine grade calcium carbonate coated with stearic acid can serve as a filler and nucleating agent.

While the concept of a high and low temperature promoter is broadly known, it has been found that in the frame of reference of the instant invention and the preferred embodiment utilizing a rigid PVC formulation, a greatly superior result is obtained utilizing a particular ratio of the various components, to wit: chemical expanding agent 0.1 to 0.5, preferably 0.2 to 0.3 weight percent; high temperature promoter 0.5 to 1.5, preferably 1.0 to 1.5 weight percent; and low temperature promoter 0.05 to 5.0, preferably 1.0 to 2.0 weight percent based on the weight of the polymer. Such a formulation having about 2 weight percent plasticizer enables the foam to be extruded at a melt temperature of about 180 to 190° C. The incorporation of a material such as calcium carbonate coated with stearic acid enables continuous operation over long periods of time without any plate-out or uncontrolled expansion. This material appears to act as a nucleating agent which gives rise to regular expansion.

An essential feature of the invention is the provision for achieving the expansion within the die head by providing a zone at the downstream end of the die head which gradually increases in cross-sectional area so that the expansion can take place within the die. The mandrel extends beyond the die face a distance generally within the range of 1–20, preferably 2–7 times its diameter, which extension has smooth, straight walls diverging in the direction of extrusion an amount within the range of 0.1° to 5°, preferably 0.25° to 1°, more preferably about 0.5°, so as to form a smooth surface on the interior of the extrudate and to expand the annular extrudate radially outward.

It has been found that it is possible to produce foamed rigid PVC extrudates of excellent quality having a final density as low as 0.65 or lower, generally within the range of 0.65 to 0.75 g./cc. Extrudates having density up to 1.4 g./cc. can also be produced. Since the expansion essentially all takes place within the die, it can be seen that the ratio of the annular cross-sectional area at the die face to the area at the point where the increased cross-sectional area begins should be within the range of 1.1:1 to 3:1, preferably about 2:1, although this can be varied depending on the exact density of the starting material and the final product density desired.

By tubular extrudate is meant pipe or any other extrudates having a central bore whether round, square or of irregular shape. Preferably such articles have a wall thickness of at least 1 mm. and are self-supporting.

Figure 2:
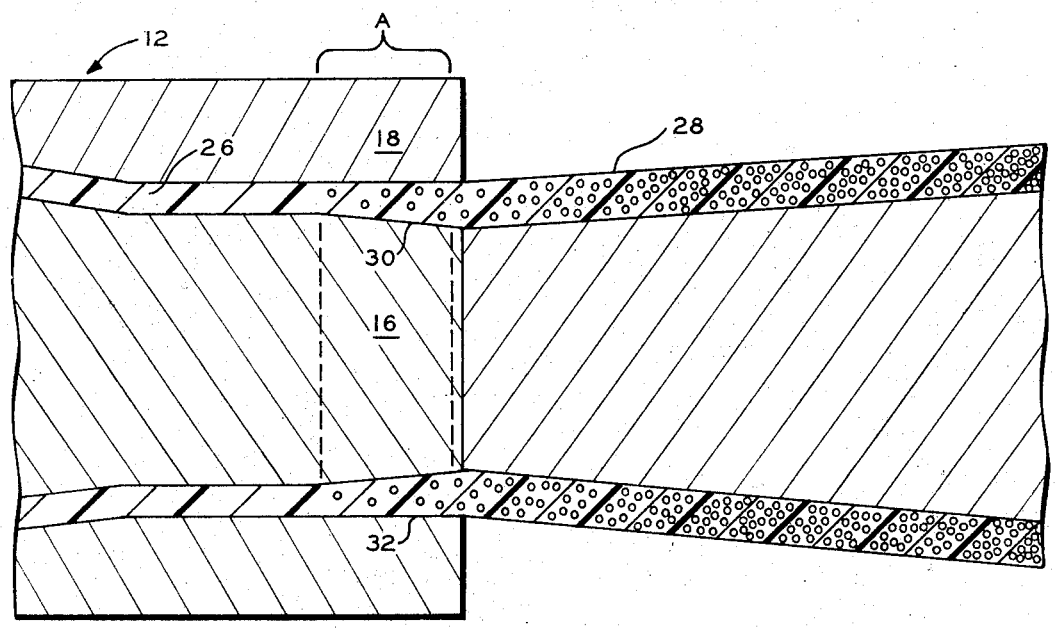
FIG. 2 is an enlarged view showing the polymer expanding within the die.

Referring now to the drawings, particularly FIG. 1 there is shown a die head 12 having a passage way 14 for conveying molten plastic under sufficient pressure to prevent expansion of a foaming agent. Centrally disposed within said die head is mandrel 16. The terminal portion of mandrel 16 as depicted by reference character A, in combination with the surrounding bushing 18 forms a zone having gradually increasing annular cross section so as to allow said polymer to gradually expand. The portion of mandrel 16 within zone A may taper inward as shown in FIGS. 1 and 2 or may taper outwardly slightly in the direction of flow with the bushing also tapering outward so long as the cross-sectional area of annulus 20 gradually increases in the direction of extrusion. It is essential to allow gradual expansion of the product within the die as opposed to allowing it to expand suddenly on exiting from the die. Mandrel 16 extends past the die face 22 as depicted by reference character 16a. The mandrel in this zone diverges outwardly a small amount. The extrudate then passes into sizing sleeve 24 in vacuum water tank 42 where the outside diameter is calibrated.

FIG. 2 shows the thermoplastic polymer-expanding agent mixture 26 under sufficient pressure that substantially no expansion is taking place with the expansion occurring in zone A to form the final expanded product 28. Here mandrel 16 is shown having an inwardly tapering configuration 30 in zone A with bushing 18 having surfaces 32 which are cylindrical.

Figure 3:
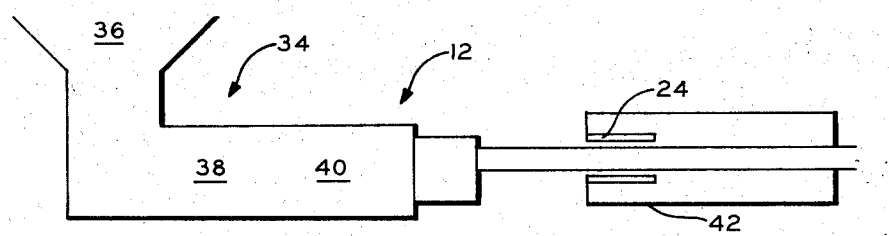
FIG. 3 is a schematic view of an entire apparatus in accordance with the invention.

FIG. 3 simply shows an extruder 34 having hopper 36 into which plastic pellets or powder are deposited along with a chemical blowing agent which blowing agent is mixed with the polymer as same is rendered into a molten condition in an initial zone 38 of said extruder prior to conveying same through zone 40 where said polymer is heated to a temperature at which the blowing agent is decomposed but is maintained under sufficient pressure that substantially no expansion takes place, whereupon the resulting mixture is conveyed to head 12 as shown in the previous drawings.

Many conventional parts have been omitted from the drawings for the sake of simplicity but their inclusion is understood by those skilled in the art and is within the scope of the invention.

EXAMPLE

The following formulations were prepared, the amounts being given in parts by weight:

| | | |
|---|---|---|
| PVC (having a K value of 60-70) | 100.0 | 100.0 |
| Tribasic lead sulphate | 1.5 | 1.5 |
| Calcium stearate | 1.0 | 1.0 |
| Monobasic lead stearate (42% PbO) | 0.5 | 0.5 |
| Stearic acid | 0.1 | 0.1 |
| Di-octyl-phthalate (DOP) | 0-5 | 0-5 |
| Azodicarbonamide type: | | |
| Genitron AC/2, AC/4 (Fisons) | 0.25-0.35 | |
| EPA (Fisons) | | 0.2-0.3 |
| Coated calcium carbonate | 1.0 | 0-1 |

These formulations were passed through an extruder of the type shown in the figures. The mandrel extended beyond the die face approximately 250 mm. and had a constant diverging taper of 0.5 degrees. The section corresponding to zone A wherein the expansion takes place had a length of 12.5 mm. with the mandrel having a diameter at the initial portion of this zone of 52.5 mm. and a diameter at the die face of 51 mm., the bushing have a diameter face of 55 mm. The resulting extrudate passed on over a mandrel extension and into a vacuum sizing tank having a metal sleeve about 12 cm. long to calibrate same and thence into water in said tank. Final product density was 0.65 g./cc. The product had a final wall thickness of 2 mm. Other runs were conducted giving products having a density of 0.65 to 0.75 g./cc. The product had a smooth surface on the inside and out and was produced for an extended period of time at high rates of extrusion. The extrusion temperature was varied from 170 to 190° C. with good results being obtained at all temperatures.

While this invention has been described in detail for the purpose of illustration it is not to be construed as limited thereby but is intended to cover all changes and modifications within the spirit and scope thereof.

I claim:

1. A process for forming low density foamed extrudates comprising:

admixing an expanding agent with a thermoplastic polymer;

rendering said thus formed admixture into a molten condition;

and maintaining said polymer mixture in said molten condition under sufficient pressure so substantially no expansion takes place within an extruder;

thereafter passing said molten admixture through an annular channel of a die having a gradually increasing cross-sectional area so as to allow said polymer to gradually expand as it moves toward the die end; and upon exiting from the die gradually expanding said thus formed and expanded annular extrudate radially outwardly by passing the same over a mandrel which has straight walls diverging toward a downstream end thereof, said mandrel extending beyond an end of said annular channel a distance equal to 1 to 20 times a diameter of said mandrel, an outer surface of said extrudate not being in contact with any forming surface during this step.

2. A method according to claim 1 wherein said polymer is rigid PVC.

3. A method according to claim 1 wherein the ratio of cross-sectional area of said molten admixture at the end of said annular channel to the cross-sectional area at the beginning of said annular channel is within the range of 1.1:1 to 3:1 and wherein said walls of said mandrel diverge an amount within the range of 0.1° to 5°.

4. A method according to claim 1 wherein said thus radially expanded annular extrudate is passed into contact with a sizing sleeve to calibrate the outside diameter thereof.

5. A method according to claim 1 wherein said polymer is rigid PVC and said expanding agent comprises a chemical blowing agent, a low temperature promoter, and a high temperature promoter.

6. A method according to claim 5 wherein said polymer mixture contains 0.5 to 2 weight percent of a plasticizer based on the weight of said polymer.

7. A method according to claim 5 wherein said polymer mixture contains 0.05 to 5 weight percent of said low temperature promoter and 0.5 to 1.5 weight percent of said high temperature promoter, said percentages based on the weight of said polymer.

8. A method according to claim 5 wherein said extrudate is a pipe.

9. A method according to claim 8 wherein said mixture comprises, based on parts by weight: PVC 100; tribasic lead sulfate 1.5; calcium stearate 1.0; monobasic lead stearate 0.5; stearic acid 0.1; dioctylphthalate 0.5; azodicarbamide 0.25–.35; and stearic acid coated calcium carbonate 1.0.

10. A method according to claim 8 wherein the extrusion temperature is 170 to 190° C. and said pipe has a final density of 0.65 to 0.75 g./cc.

(References on following page)

References Cited

UNITED STATES PATENTS

| | | | |
|---|---|---|---|
| 3,160,917 | 12/1964 | Burggren et al. | 425—325 XR |
| 3,413,388 | 11/1968 | Lux et al. | 264—46 |
| 3,431,164 | 3/1969 | Gilbert | 264—48 XR |
| 3,461,496 | 8/1969 | Winstead | 264—48 UX |
| 3,466,705 | 9/1969 | Richie | 264—53 XR |
| 3,488,746 | 1/1970 | Gilbert | 264—53 |
| 3,658,730 | 4/1972 | Takahashi et al. | 264—Dig. 5 |

FOREIGN PATENTS

| | | | |
|---|---|---|---|
| 1,963,811 | 6/1971 | Germany | 264—48 |

PHILIP E. ANDERSON, Primary Examiner

U.S. Cl. X.R.

161—161; 260—2.5 E; 264—209, Dig. 5, Dig. 13; 425—325, 467